US012791696B2

(12) United States Patent
Wyne et al.

(10) Patent No.: US 12,791,696 B2
(45) Date of Patent: Nov. 10, 2026

(54) METHOD FOR DETERMINING A MOVEMENT STATE OF A RIGID BODY

(71) Applicant: Robert Bosch GmbH, Stuttgart (DE)

(72) Inventors: Mughees Ahmad Wyne, Offenbach (DE); Sebastian Scherer, Tuebingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 523 days.

(21) Appl. No.: 18/547,026

(22) PCT Filed: Mar. 4, 2022

(86) PCT No.: PCT/EP2022/055591
§ 371 (c)(1),
(2) Date: Aug. 18, 2023

(87) PCT Pub. No.: WO2022/194576
PCT Pub. Date: Sep. 22, 2022

(65) Prior Publication Data

US 2024/0134033 A1 Apr. 25, 2024

(30) Foreign Application Priority Data

Mar. 18, 2021 (DE) ..................... 10 2021 202 641.9

(51) Int. Cl.
*G01S 13/58* (2006.01)
*G01S 7/02* (2006.01)
(Continued)

(52) U.S. Cl.
CPC .......... *G01S 13/583* (2013.01); *G01S 7/0232* (2021.05); *G01S 7/0235* (2021.05); *G01S 13/282* (2013.01); *G01S 17/26* (2020.01); *G01S 17/58* (2013.01)

(58) Field of Classification Search
CPC ...... G01S 13/583; G01S 17/26; G01S 7/0235; G01S 7/0232; G01S 13/282; G01S 17/58
See application file for complete search history.

(56) References Cited

U.S. PATENT DOCUMENTS 11,015,936 B2 * 5/2021 Zhang ................ G01C 21/1654
11,448,746 B2 * 9/2022 Stachnik ............... G01S 7/2921
(Continued)

FOREIGN PATENT DOCUMENTS

DE 10252323 A1 5/2004
DE 102008026397 A1 1/2009
(Continued)

OTHER PUBLICATIONS

Monaco et al., Radarodo: Ego-Motion Estimation From Doppler and Spatial Data in Radar Images, Sep. 2020, IEEE Transactions on Intelligent Vehicles, vol. 5, No. 3, pp. 475-484 (Year: 2020).*
(Continued)

*Primary Examiner* — Olumide Ajibade Akonai
*Assistant Examiner* — Eric K Hodac
(74) *Attorney, Agent, or Firm* — NORTON ROSE FULBRIGHT US LLP

(57) ABSTRACT

A method for determining a movement state of a rigid body relative to an environment using a multiplicity of measurement data sets relating to objects in the environment around the body. Each measurement data set includes a measurement time, a Doppler velocity, and an azimuth angle in relation to a respective sensor reference system. The method includes determining a movement state of the body relative to the environment as a velocity vector and an angular velocity vector in a body reference system. At least one set of conditions that includes a plurality of measurement data sets is created. A function dependent on Doppler velocity deviations between estimated Doppler velocities and the
(Continued)

Doppler velocities of the measurement data sets included in the set of conditions is minimized in a regression analysis for the set of conditions. The estimated Doppler velocities are regarded as dependent variables in the regression analysis.

21 Claims, 3 Drawing Sheets

(51) Int. Cl.

*G01S 13/28* (2006.01)
*G01S 17/26* (2020.01)
*G01S 17/58* (2006.01)

(56) References Cited

U.S. PATENT DOCUMENTS 12,248,053 B2 * 3/2025 Lessmann ............... G01S 13/60
2020/0241124 A1 7/2020 Fei et al.
2021/0063560 A1 3/2021 Bosse
2023/0305141 A1 * 9/2023 Hong ...................... G01S 7/412

FOREIGN PATENT DOCUMENTS

DE 102017214022 A1 2/2019
DE 102019202178 A1 6/2020

OTHER PUBLICATIONS

Texas Instruments: 77GHz single chip radar sensor enables automotive body and chassis applications, Dec. 2017, pp. 1-11; URL:https://www.ti.com/liUwp/spry315/spry315.pdf [accessed Dec. 15, 2021].
International Search Report for PCT/EP2022/055591, Issued Jun. 9, 2022.

* cited by examiner

METHOD FOR DETERMINING A MOVEMENT STATE OF A RIGID BODY

FIELD

The present invention relates to a method for determining a movement state of a rigid body relative to an environment by way of a multiplicity of measurement data sets, to a method for determining a relative position and/or a relative orientation, and to an arithmetic logic unit and computer program for carrying out the methods.

BACKGROUND INFORMATION

Odometry deals with the problem of determining the position and orientation of a mobile body, for example a vehicle and/or a robot. To do so, the movement state of the body can be determined, for example a velocity and/or an angular velocity to which differences in consecutive positions or orientations of the body correspond. To determine the movement state, inertial measurement apparatuses, i.e., accelerometers and gyroscopes, can be used, which determine the movement state or components thereof directly by measurements. In addition, cameras attached to the body can be used, the image or video recordings of which allow the movement state to be estimated by way of suitable image processing software.

SUMMARY

According to the present invention, a method for determining a movement state of a rigid body relative to an environment by way of a multiplicity of measurement data sets is provided, along with a method for determining a relative position and/or a relative orientation and an arithmetic logic unit and computer program for carrying out the methods. Advantageous embodiments of the present invention are disclosed herein.

The present invention uses the measure of determining sets of conditions from measurement data sets and determining the movement state on that basis by way of a regression analysis. By creating sets of conditions, measurement data sets can be sought out in a targeted manner, and so a high level of accuracy can be obtained when determining the movement state.

Specifically, according to an example embodiment of the present invention, the method uses a multiplicity of measurement data sets relating to objects in the environment around the body, each measurement data set including a measurement time, a Doppler velocity, and an azimuth angle in relation to a (three-dimensional) sensor reference system of a sensor. The measurement data sets can be captured by one or more sensors, each sensor having a sensor reference system on which the measurement results included in the measurement data sets are based. Each measurement data set relates to an object captured by the sensors; in other words, each measurement data set relating to an object includes a measurement time, a Doppler velocity, and an azimuth angle in relation to a sensor reference system of the sensor that captures the object. The measurement data sets can be provided in a suitable way. Preferably, the method comprises a corresponding providing step.

Generally, for the purpose of the present invention, measurement data sets from sensors that determine a Doppler velocity of objects, i.e., determine a radial velocity toward or away from the sensor, can be used. Therefore, they can also be termed Doppler sensors. Preferably, the sensors are radar sensors and/or LiDAR sensors. In particular, the use of FMCW radar sensors and/or FMCW LiDAR sensors (radar: 'radio detection and ranging'; LiDAR: 'light detection and ranging' or 'light imaging, detection and ranging'; FMCW: 'frequency-modulated continuous wave') is intended. Accordingly, the measurement data sets are preferably radar measurement data sets and/or LiDAR measurement data sets.

Preferably, according to an example embodiment of the present invention, one or more (in particular all) of the measurement data sets include an elevation angle (in relation to the sensor reference system of each sensor). The accuracy of the determination of the movement state can be considerably increased by taking the elevation angle into account. More preferably, at least some of said one or more measurement data sets (in particular all of them) are determined from measurement results that include only the measurement time, the Doppler velocity, and the azimuth angle, the elevation angle being set to be identical to a predetermined value, in particular exactly zero. Older radar sensors or LiDAR sensors often do not measure or determine the elevation angle. The corresponding measurement results thus initially include only the Doppler velocity and the azimuth angle. To be able to use measurement results both including and not including an elevation angle, it is assumed that the elevation angle has a predetermined value, preferably zero (the predetermined value is based on the sensor, i.e., is the same for different measurement results from the same sensor). Setting the elevation angle to zero, or more generally to a predetermined value, makes uniform handling possible. For the sake of simplicity, the remainder of the description will only refer to the case where the sensors capture the elevation angle. If the sensors do not do so, the elevation angle is, as stated above, intended to be identical to the predetermined value or exactly zero, even if this is not specifically mentioned. It goes without saying that measurement data sets obtained from measurement results in which the elevation angle was set to the predetermined value can be used together with measurement data sets in which the elevation angle is already included from the outset. Even if the elevation angle is measured, it can also be set to be identical to the predetermined value, in particular exactly zero, for example in order to simplify the equations used in the regression analysis and thus shorten the calculation period.

According to an example embodiment of the present invention, the method further comprises determining the movement state of the body relative to the environment as a velocity vector and an angular velocity vector in a body reference system, each sensor reference system being able to be translated (i.e., mapped) into the body reference system by a non-singular transformation.

The term 'velocity vector' relates to the linear velocity (as opposed to the angular velocity) and is also referred to as the linear velocity vector in the context of this description. The linear velocity vector and the angular velocity vector are indicated in the three-dimensional body reference system. Since they are calculated on the basis of (Doppler) measurements relating to objects in the environment, they indicate a velocity relative to the objects. In principle, the (stationary) objects in turn define an environment reference system, and so the linear velocity vector and the angular velocity vector indicate the movement state (represented in the body reference system) relative to the environment or the environment reference system.

Since the (three-dimensional) sensor reference systems are linked (i.e., in particular also reversibly) to the (three-dimensional) body reference system by respective non-singular transformations (one for each sensor reference system or sensor) or can be mapped into one another, it is ensured that the relative orientation and position of the sensors (the 'sensor pose') are taken into account when determining the movement state. For instance, if the per se three-dimensional measurement data were projected into a plane, information would be lost and the accuracy of the determination of the movement state would be reduced. The sensor reference systems and the body reference system each have three dimensions. Accordingly, the velocity vector and the angular velocity vector also have three dimensions or components each. The movement state is thus a movement state in the three-dimensional space, determined by 3+3=6 components.

According to an example embodiment of the present invention, when determining the movement state, at least one set of conditions that includes a plurality of measurement data sets is created, a functional that is dependent on Doppler velocity deviations between estimated Doppler velocities and the Doppler velocities of the measurement data sets included in the at least one set of conditions being minimized in a regression analysis for the at least one set of conditions, the estimated Doppler velocities being included or represented in the regression analysis as dependent variables (which are dependent on the azimuth angle and, where applicable, on the elevation angle of the relevant measurement data set), at least one component of the velocity vector and/or of the angular velocity vector being determined by the regression analysis. The Doppler velocities representing dependent variables are each correlated with the velocity vector and the angular velocity vector by a mapping that is dependent on the azimuth angle and, where applicable, on the elevation angle of the relevant measurement data set and the relevant transformation between the sensor reference system and body reference system.

According to an example embodiment of the present invention, the movement state of the body, i.e., the velocity vector and the angular velocity vector or at least one component thereof, is calculated as part of the regression analysis. The estimated Doppler velocities are dependent on the azimuth angle and, where applicable, on the elevation angle of the relevant measurement data set, but this should not be construed to mean that the azimuth and elevation angles have to be independent variables in the regression analysis. In particular, the estimated Doppler velocities can be represented in a regression method incorporated in the regression analysis, or an incorporated regression, by equations as a function of the azimuth and elevation angles of the relevant measurement data set and as a function of the velocities to be determined in the regression method or the regression, i.e., the velocity vector and the angular velocity vector or the velocity vectors of the sensors; see equation systems (2) and (5) below. The velocities to be determined represent the variables to be varied if the regression method or the regression is regarded as an optimization problem or variation problem.

According to an example embodiment of the present invention, preferably, all of the components (six in total) of the velocity vector and/or of the angular velocity vector are determined by the regression analysis (i.e., they represent variables to be varied). However, it is also possible for one or more components to be fixed in the sense of a constraint (in a rail-borne vehicle, for example, it can be specified that no crosswise motion can take place), or to be specified by a measurement result that is independent of the sensors (for example by an angular rate sensor). In this case, the corresponding components can be determined by the constraint or by the independent measurement result and cannot be used in the regression analysis as variables to be varied. Preferably, however, components for which there is a constraint or an independent measurement result are also taken into account, i.e., varied, in the regression analysis, with additional conditions that correspond to the constraint or the independent measurement result also being incorporated. These additional conditions are given a weight relative to the measurement data sets, said weight expressing the degree to which the constraint or the independent measurement result is to be taken into account.

The term 'conditions' is intended to refer to the fact that these are to be satisfied as far as possible in terms of the regression analysis, i.e., in terms of the functional. 'Conditions' thus do not represent absolute conditions that absolutely have to be exactly satisfied.

According to an example embodiment of the present invention, preferably, the one or more sensors are attached to the body such that they capture the environment around the body. Preferably, the measurement data sets are captured using the one or more sensors that are attached to the body and capture the environment around the body. The method preferably comprises taking measurements using the one or more sensors in order to capture the measurement data sets. Capturing the measurement data sets in accordance with these statements can be regarded as at least part of a providing step that is preferably incorporated in the method.

According to an example embodiment of the present invention, preferably, the measurement data sets comprise at least two measurement data sets from the same sensor having different measurement times. Capturing a plurality of measurement data sets having different measurement times allows the movement state to be determined more accurately, and specifically also allows the movement state to be determined for different (determination) times.

According to an example embodiment of the present invention, preferably, the measurement times of measurement data sets from at least two different sensors are different from one another. This can prevent interference occurring between different sensors, which would lead to unreliable measurement data sets.

According to an example embodiment of the present invention, preferably, the movement state for a determination time is determined at a calculation time, the at least one set of conditions being created from the measurement data sets whose measurement times are within a determination period in which expediently the determination time is also found. As a result, this means that to determine the movement state, it is possible to take account of only certain measurement data sets that have a measurement time approximately temporally close to the determination time. Measurement data sets having measurement times outside the determination period are not added to the set of conditions. By way of example, this can prevent account being taken of temporally far-away measurement data sets during which a different movement state was present.

The term 'calculation time' should be understood as the time at which the relevant data (measurement data sets) taken as the basis for determining the movement state are determined or selected. In each determination of the movement state, it is possible to take into account (i.e., add to the relevant set of conditions) only measurement data sets having a measurement time that is before the calculation time or identical to the calculation time. The calculation itself of course lasts for a calculation period (the length of which is dependent on the available computing power). The calculation time can be regarded as a starting time of the calculation or of the calculation period.

According to an example embodiment of the present invention, preferably, in the functional, the Doppler velocity deviations are multiplied by a positive time weight that is a function of the time difference between the measurement time of each measurement data set and the determination time for which the movement state is determined. More preferably, the time weight decreases as the magnitude of the time difference increases. In this way, when the weights are selected accordingly, greater consideration can be given in the regression analysis to measurement data sets that are temporally close to the determination time, and thus better characterize the movement state to be determined, than temporally further-away measurement data sets.

According to an example embodiment of the present invention, preferably, the movement state for a plurality of successive determination times is determined, each determination period of the plurality of successive determination times having a lower time limit and an upper time limit, the lower time limit being identical to a previous determination time of the plurality of successive determination times and the upper time limit being identical to a subsequent determination time of the plurality of successive determination times or to the particular calculation time. Therefore, to obtain a high level of accuracy in the event of a plurality of successive determination times, account is taken only of the measurement data sets that are clearly associated with the determination time or are not found beyond a previous or subsequent determination time.

Furthermore, according to an example embodiment of the present invention, preferably a first determination of the movement state for the determination time is carried out on the basis of a first determination period, and a second determination of the movement state for the determination time is carried out on the basis of a second determination period, the second determination period being different from the first determination period and including at least one measurement time that is not included in the first determination period. More preferably, the first determination is carried out at a first calculation time and the second determination is carried out at a second, later calculation time, an upper time limit of the second determination period coming after the first calculation time. This allows the movement state to be determined multiple times for the same determination time if new measurement data sets are available. The first determination can be deemed a first estimation that occurs at an early time and which, if new measurement data sets are available, is improved at a second, later calculation time in order to obtain a better estimation, namely the second determination.

According to an example embodiment of the present invention, preferably, the estimated Doppler velocities are also represented in the regression analysis as being dependent on the velocity vector and the angular velocity vector by using the transformation between the respective sensor reference system and the body reference system, and the velocity vector and the angular velocity vector are determined such that the functional is minimized. Owing to this approach, all the measurement data sets are taken into account in the regression analysis at the same time, leading to a high level of accuracy.

According to an example embodiment of the present invention, preferably, a plurality of sets of conditions are created, each of which includes measurement data sets from just one sensor. A plurality of sensor velocity vectors are determined in each sensor reference system by also representing the estimated Doppler velocities as being dependent on the sensor velocity vector for each of the sets of conditions in the regression analysis, and the body sensor velocity vector is determined such that the respective functional is minimized. The velocity vector and the angular velocity vector, or one or more components thereof, are determined in a regression such that a regression functional, which is dependent on sensor deviations between the sensor velocity vectors and estimated sensor velocity vectors, is minimized, the sensor velocity vectors also being represented as being dependent on the velocity vector and the angular velocity vector by using the transformation between the body reference system and the respective sensor reference system. Owing to this approach, first the velocity vectors of the sensors are determined, and then the movement state of the body is determined on that basis. This two-stage approach requires relatively little computing power since the equation systems or sets of conditions to be satisfied are relatively small.

According to an example embodiment of the present invention, preferably, each of the sets of conditions includes only measurement data sets that have the same measurement time, the sensor deviations each being multiplied in the regression functional, where applicable, by a weight that is a function of the time difference between the measurement time of the relevant set of conditions and the determination time for which the movement state is determined. This allows different measurement times to be taken into account.

According to an example embodiment of the present invention, preferably, the sets of conditions include at least one component constraint on at least one component of the velocity vector and/or of the angular velocity vector in the form of at least one component default value. The functional or, where applicable, the regression functional is also dependent on a component deviation between the at least one component default value and at least one estimated component default value. The component constraints represent conditions that are independent of the measurement data sets, and so they are not impaired by errors or inaccuracies relating to a multiplicity of measurement data sets and thus help improve the accuracy of the determination of the movement state.

According to an example embodiment of the present invention, preferably, at least one angular velocity component, which is determined in particular by an angular rate sensor, is used in the body reference system as a component default value; more preferably, where applicable, in the functional or the regression functional the at least one component deviation is multiplied by a weight that is a function of the time difference between the measurement time of the angular rate sensor and the determination time for which the movement state is determined. Typically, angular rate sensors have relatively high measurement accuracy, and so including accordingly determined or measured angular velocity components can improve an accurate determination of the movement state.

According to an example embodiment of the present invention, preferably, the measurement data sets include at least one additional parameter selected from a distance from the captured object, a variance in the distance, a variance in the azimuth angle, a variance in the elevation angle, a variance in the Doppler velocity, a signal strength of the received signal, a cross section (i.e., an effective cross section of an object), in particular a radar cross section or LiDAR cross section, in each case based on the captured object of the relevant measurement data set, and a type of sensor and, where applicable, an arrangement of the sensor on the body. The Doppler velocity deviations are multiplied by an additional weight that is a function of the relevant additional parameter. Alternatively or additionally, a measurement data set is rejected if the at least one additional parameter is outside at least one predetermined range. In this way, greater consideration can be given to measurement data sets in which high reliability can be assumed on the basis of the additional parameters. Equally, less consideration, or no consideration at all, can be given to unreliable measurement data sets. Thus, higher accuracy in the determination of the movement state of the body can be obtained.

According to an example embodiment of the present invention, preferably, the regression analysis is carried out using a so-called error-in-variables regression method, in which case the azimuth angle and/or, where applicable, the elevation angle are optimized. Thus, the accuracy in the determination of the movement state of the body can be increased further.

According to an example embodiment of the present invention, preferably, the regression analysis is carried out using an iteratively reweighted least squares method. An inaccurate determination of the movement state as a result of outliers in the measurement data sets, in particular those of dynamic, non-static objects in the environment, can thus be prevented.

A method according to an example embodiment of the present invention for determining a relative position and/or a relative orientation of a rigid body comprises determining a plurality of movement states of the body for a plurality of successive determination times according to the present invention, and integrating the movement states over the time between a starting determination time of the plurality of determination times and an end determination time of the plurality of determination times in order to obtain the relative position and/or the relative orientation as results of said integration.

An arithmetic logic unit according to the present invention, for example a controller of a motor vehicle or of a robot, is configured, in particular programmed, to obtain a multiplicity of measurement data sets and to carry out a method according to the present invention having the above aspects.

A vehicle according to the present invention and/or a robot according to the present invention, in particular a landcraft, aircraft, or watercraft and/or a land-based, aerial, or aquatic robot, comprises an arithmetic logic unit according to the present invention and one or more sensors that are attached to a body of the vehicle and/or robot, capture an environment around the body, and are configured to take measurements relating to objects in the environment and to send measurement data sets captured in the process to the arithmetic logic unit. Preferably, the sensors are radar sensors and/or LiDAR sensors.

It is also advantageous to implement a method according to the present invention in the form of a computer program or computer program product comprising program code for carrying out all the method steps, in particular those relating to the regression analysis and the creation of the set of conditions, since this entails particularly low costs, in particular if an executing controller is also used for other tasks and is therefore present anyway. Suitable data media for providing the computer program are, in particular, magnetic, optical, and electrical memories, for example hard disks, Flash memories, EEPROMs, DVDs, etc. Downloading a program via computer networks (internet, intranet, etc.) is also possible.

Further advantages and embodiments of the present invention become apparent from the description and the figures.

The present invention is shown schematically in the figures on the basis of exemplary embodiments and will be described below with reference to the figures.

DETAILED DESCRIPTION OF EXAMPLE EMBODIMENTS

Figure 1:
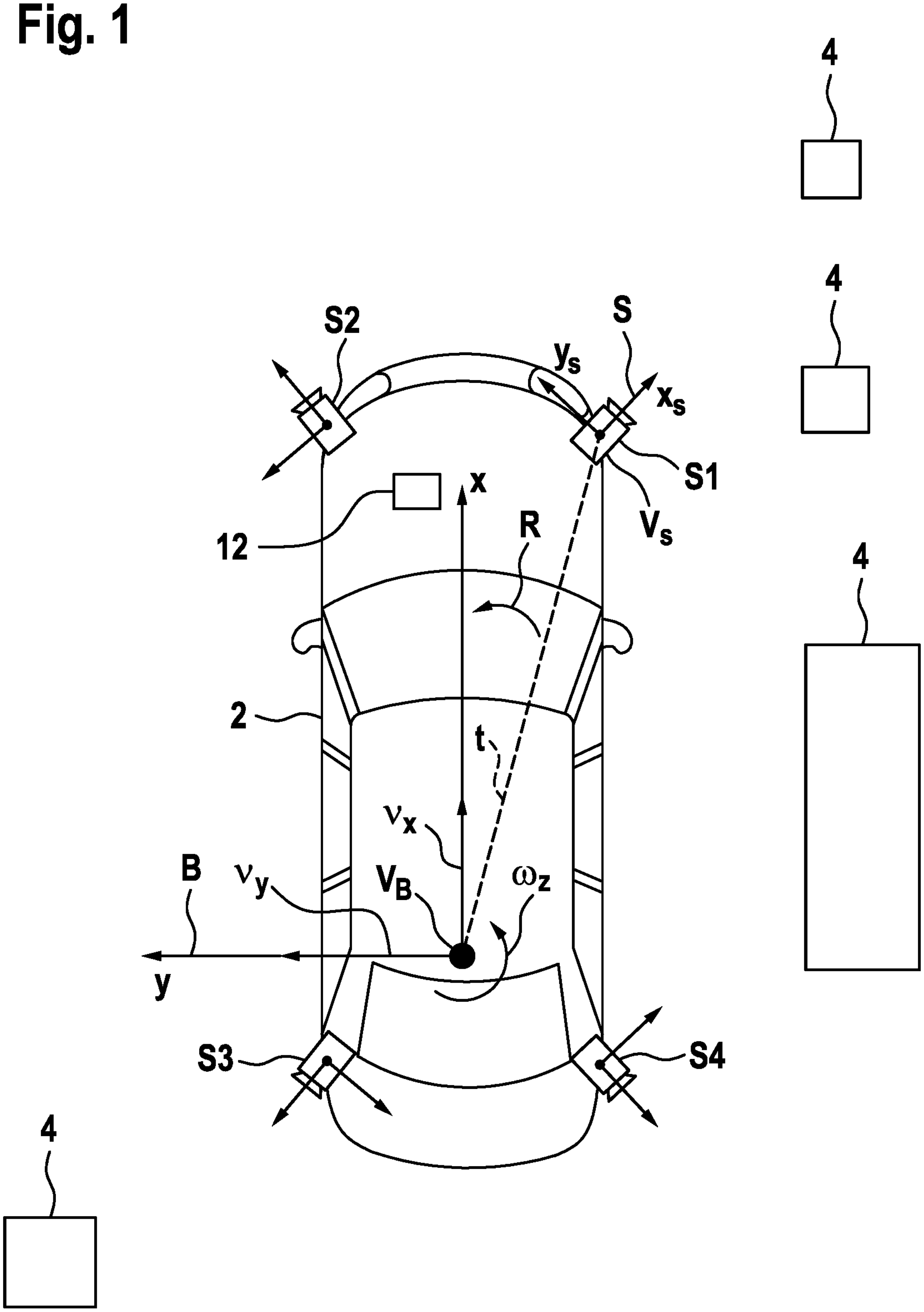
FIG. 1 is a plan view of a vehicle to which sensors are attached.

FIG. 1 is a plan view of a motor vehicle 2 (as an example of a rigid body) to which sensors S1, S2, S3, S4 are attached (e.g., radar sensors and/or LiDAR sensors). Other vehicles such as aircraft and watercraft are also possible as rigid bodies. Robots are equally possible. In particular, the vehicle can be automated (robotic vehicle). Generally speaking, the present invention can also be used with rigid bodies that are not self-driving. The motor vehicle (more generally the body) defines a body reference system B having three mutually orthogonal axes, i.e., an x axis, a y axis, and a z axis, which in the plan view extends out of the plane of the drawing perpendicularly thereto. For a motor vehicle or a vehicle, the origin $U_B$ of the body reference system B is preferably placed at the center of rotation of the vehicle. In a motor vehicle having Ackermann steering, this is the middle of the rear axle, as shown.

The rigid body, i.e., the motor vehicle 2, moves in an environment in which objects 4 such as trees, buildings, and other motor vehicles are found. In this case, both static objects, i.e., objects that are not moving in the environment, and moving objects can be present. The static objects are located at fixed positions in the environment or in an environment reference system.

The body (motor vehicle 2) moves in the environment. This movement, i.e., the movement state of the body in the environment reference system, can be represented in the body reference system B using a linear velocity vector ($V_x$, $V_y$, $V_z$) and an angular velocity vector ($\omega_x$, $\omega_y$, $\omega_z$); the components of the velocity vector represent the velocities of the body in the environment reference system but along the respective axes x, y, z of the body reference system, and the components of the angular velocity vector represent the angular velocities of the body in the environment reference system but about the respective axes x, y, z of the body reference system. Only $V_x$, $V_y$ and $\omega_z$ are indicated in the view in FIG. 1.

The sensors S1, S2, S3, S4 are attached in certain positions on the body, in this case at the four corners of the motor vehicle 2. A different number of sensors is also possible, the number of sensors preferably being in the range from 1 to 10, more preferably in the range from 3 to 6. By contrast with what is shown, sensors can be attached not only to corners but also to any other sites on the rigid body.

Each of the sensors defines a sensor reference system. In FIG. 1, a sensor reference system S is indicated to represent one of the sensors S1, said system having mutually orthogonal axes, i.e., an x axis $x_s$, a y axis $y_s$, and a z axis $z_s$. The z axis is not indicated in the plan view and can, but need not, extend perpendicularly to the plane of the drawing or in parallel with the z axis of the body reference system.

The sensor reference system of each of the sensors is linked to the body reference system by way of a linear transformation, i.e., can be mapped therein by the transformation. Vectors/coordinates in each of the sensor reference systems can thus be mapped into corresponding vectors/coordinates in the body reference system by the relevant transformation. The transformation for each of the sensor reference systems is in each case specified by combining a translation t (characterized by a three-dimensional translation vector between the origin $U_B$ of the body reference system and an origin $U_s$ of the sensor reference system) and a rotation R (characterized by a Euler angle, for example) (again indicated as representing one of the sensors). The transformation is thus a transformation between two three-dimensional spaces. It should be non-singular.

In addition, the vehicle in FIG. 1 preferably comprises an arithmetic logic unit 12 (for example a controller) that is configured to receive measurement data sets from the sensors and to determine a movement state on that basis, the arithmetic logic unit being configured to carry out a regression analysis, in particular as described in more detail below.

Figure 2:
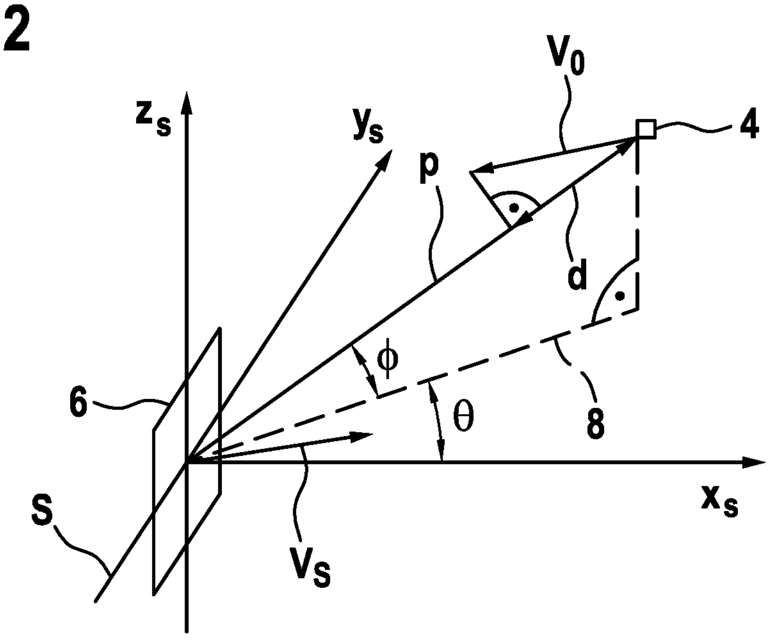
FIG. 2 shows a reference system of a sensor that captures an object.

FIG. 2 shows a reference system S of a sensor (a radar sensor and/or a LiDAR sensor), i.e., a sensor reference system, that captures an object 4. The sensor reference system S has an x axis $x_s$, a y axis $y_s$, and a z axis $z_s$, which are mutually orthogonal. By way of example, a schematically shown sensor surface 6 of the sensor is arranged in the y-z plane in this case and captures the half-space having coordinates $x_s>0$ as the field of vision. It goes without saying that the sensors can also have a different field of vision (other than a half-space). The sensor or sensors used for the present invention are configured to determine, by making use of the Doppler effect, a velocity of a captured object, referred to as the Doppler velocity, toward or away from the sensor; in other words, Doppler sensors are used. Preferably, the sensors are radar sensors or Doppler radar sensors and/or LiDAR sensors.

The position of the object 4 is specified by an object position vector P that extends from the origin $U_s$ of the sensor reference system to the object 4. Said object position vector can be indicated by spherical coordinates (θ, ϕ, r) in the sensor reference system. The radius $r=|P|_2$ is the length of the object position vector P, i.e., the distance between the origin $U_s$ and the object 4. The azimuth angle θ is the angle between the x axis $x_s$ and the projection 8 of the object position vector P into the x-y plane. The elevation angle ϕ is the angle between the x-y plane and the object position vector P. Accordingly:

$$P=(x_S, y_S, z_S)=(r\cos\theta\cos\phi, r\sin\theta\cos\phi, r\sin\phi)$$

The object 4 has a velocity, characterized by an object velocity vector $V_o$, relative to the sensor or in the sensor reference system. The velocity of the sensor relative to the object is accordingly specified by $V_s=-V_o$. The Doppler velocity d is specified by the length of the projection of the object velocity vector $V_o$ onto the object position vector P. This length is equal to the scalar product $d=p^0 \cdot V_o$ between the object velocity vector $V_o$ and a unit vector $p^0$ in the direction of the object position vector P, where $p^0=P/r$. Overall, therefore, the Doppler velocity d can be expressed by the velocity vector $V_s=(V_{Sx}, V_{Sy}, V_{Sz})$ of the sensor relative to the object:

$$-d=(\cos\theta\cos\phi, \sin\theta\cos\phi, \sin\phi)\begin{pmatrix} V_{Sx} \\ V_{Sy} \\ V_{Sz} \end{pmatrix} = V_{Sx}\cos\theta\cos\phi + V_{Sy}\sin\theta\cos\phi + V_{Sz}\sin\phi$$

The sensor captures a multiplicity of measurement data sets (e.g., 50 to 150 measurement data sets) at a single measurement time, and so with each measurement by the sensor a multiplicity of Doppler velocities and corresponding azimuth and elevation angles are ascertained. The static objects define the environment relative to which the velocity of the sensor, and more broadly of the rigid body, can be determined by way of the measured Doppler velocities.

To be able to clearly represent the relevant equations despite the high number of measurement data sets, a suitable notation is introduced hereinafter.

Vectors, matrixes, and scalars: vectors and matrixes are shown in bold to make them easier to distinguish from scalars.

Points in the three-dimensional (3D) space: a point p to be expressed in Cartesian coordinates in relation to a coordinate system or reference system A is written as ${}_Ap$.

Vectors between two points in the 3D space: a translation vector between two points B and C in relation to a reference system A is written as ${}_At_{B,C}$.

Velocities of the reference system in the 3D space: if a reference system C moves relative to a reference system B at a particular linear or angular velocity, the relevant velocity in relation to the relative reference system A for linear velocities is written as:

$${}_Av_{B,C}$$

and for angular velocities it is written as:

$${}_A\omega_{B,C}$$

Rotations and transformations of the rigid body: a transformation between two reference systems A and B is written as:

$$T_{A,B}$$

A transformation of this kind transforms points expressed in reference system B into reference system A:

$$T_{A,B}\cdot{}_Bp={}_Ap$$

Since transformations include a rotation and a translation, this can also be written as:

$$R_{A,B}\cdot{}_Bp+{}_At_{A,B}={}_Ap$$

where $R_{A,B}$ is the corresponding turning or rotation matrix. $T_{A,B}$ can be regarded as a position and orientation of one reference system relative to the other (also referred to as the 'pose').

The reference system of the rigid body, i.e., the body reference system, is denoted by 'B'. The reference system of a sensor, i.e., a sensor reference system, is denoted by 'S', 'S1', 'S2', . . . 'Si', . . . 'SI', the sensors themselves also in part being denoted by S, S1, S2, . . . Si, . . . SI for the sake of simplicity. The reference system of the environment is denoted by 'W'.

Expressed in Cartesian coordinates or polar coordinates and using the present notation, the position of an object in the reference system Si of a sensor is as follows:

$$_{si}p_j = (x, y, z)^T = r(\cos\theta\ \cos\phi, \sin\theta\ \cos\phi, \sin\phi)^T$$

where 'j' denotes a measurement data set (of the multiplicity thereof) of an object (e.g., results of a radar measurement or LiDAR measurement). If a sensor Si moves at a velocity $_{Si}v_{W,Si}$ relative to the environment W in which the object is a static object, equation (1) applies as described above:

$$d_j = -\left({}_{Si}p_j^0\right)^T {}_{Si}v_{W,Si} \text{ where } p^0 = \frac{p}{|p|_2} = (\cos\theta\cos\phi, \sin\theta\cos\phi, \sin\phi)^T$$

are the normalized point coordinates of the object, i.e., the unit vector in the direction of the object ($|\bullet|_2$ denotes the usual 2-norm, i.e., the length of the vector).

From a plurality of measurement data sets of a plurality of Doppler velocities $d_j$, where j is selected from 1, 2, . . . J (J is the number of measurement data sets used; in this case a plurality of measurement data sets of a single object and/or measurement data sets of different objects can be included at one measurement time), the following equation system (2) is produced:

$$\begin{pmatrix} \cos\theta_1\cos\phi_1 & \sin\theta_1\cos\phi_1 & \sin\phi_1 \\ \vdots & \vdots & \vdots \\ \cos\theta_J\cos\phi_J & \sin\theta_J\cos\phi_J & \sin\phi_1 \end{pmatrix} \begin{pmatrix} {}_{Si}vx_{W,Si} \\ {}_{Si}vy_{W,Si} \\ {}_{Si}vz_{W,Si} \end{pmatrix} = \begin{pmatrix} -d_1 \\ \vdots \\ -d_J \end{pmatrix}$$

If measurement data sets do not include an elevation angle $\phi$, the corresponding elevation angles $\phi_j$ are assumed or set to be equal to a predetermined angle in this equation system. Preferably, these elevation angles are set to be exactly zero ($\phi_j=0$ for measurement data sets j for which there is no elevation angle). This leads to the equation system being simplified since the cosine and sine of said elevation angles are accordingly 1 and 0, respectively. In simpler notation, equation system (2) can be written as:

$$\begin{pmatrix} (p_1^0)^T \\ \vdots \\ (p_J^0)^T \end{pmatrix} {}_{Si}v_{W,Si} = \begin{pmatrix} -d_1 \\ \vdots \\ -d_J \end{pmatrix}$$

$$A \cdot {}_{Si}v_{W,Si} = D$$

where A and D are used to denote the respective vectors in the equation system; these are specified by measured values from the sensors.

A results from the azimuth angle $\theta$ and the elevation angle $\phi$ of a measurement data set, and D results from the corresponding measured Doppler velocities $d_j$.

Therefore, when a multiplicity of measurement data sets from a sensor Si are available, the velocity $_{Si}v_{W,Si}$ of the sensor can be estimated or determined by solving said equations, the equations generally creating an overdetermined equation system. The measurement data sets can be regarded as conditions for the sensor velocity that are to be satisfied in terms of the above equation system. The multitude of measurement data sets or at least a part thereof thus represents a set of conditions.

The above equation system (1) can be solved by way of a regression, the sensor velocity $_{Si}v_{W,Si}$ being determined or varied such as to minimize an error measure, i.e., a regression functional F, which is dependent on a difference (Doppler velocity deviation ($d_j-\hat{d}_j$)) between the measured Doppler velocities $d_j$ and the estimated Doppler velocities $\hat{d}_j$, which are specified by the left-hand side of the equation system for each sensor velocity. By way of example, a mean square error could be minimized:

$$F = F\left[(d_1 - \hat{d}_1), \ldots, (d_j - \hat{d}_j), \ldots, (d_J - \hat{d}_J)\right] \sim \sum_j (d_j - \hat{d}_j)^2$$

It goes without saying that functional dependencies other than squares are also possible.

In addition, weights $g_j$ which are dependent on additional parameters that are additionally captured by the sensor during a measurement (e.g., radar measurement or LiDAR measurement) can be provided in this case. The weights $g_j$ can also be referred to as parameter weights. In the functional, the difference between the measured Doppler velocities $d_j$ and the estimated Doppler velocities $\hat{d}_j$ is then multiplied by the corresponding weight $g_j$. This results in the following:

$$F = F\left[g_1(d_1 - \hat{d}_1), \ldots, g_j(d_j - \hat{d}_j), \ldots, g_J(d_J - \hat{d}_J)\right] \sim \sum_j g_j^2 (d_j - \hat{d}_j)^2$$

By way of example, a measurement data set in which the azimuth and/or elevation angle have a high degree of uncertainty or variance can be given a lower weight relative to measurement data sets in which there is a low degree of variance.

Depending on additional parameters, individual measurement data sets can also remain disregarded, i.e., are not incorporated in the above equation system (2), for example if a distance from an object is above a predetermined threshold. Setting the corresponding (parameter) weight $g_j$ to exactly zero has a similar effect.

Generally speaking, the measurement data sets contain errors; in particular, not all the captured objects will generally be static objects, and so there will be outliers in the measurement data sets that distort the determination of the sensor velocity. To minimize this effect, a robust regression method is preferably used. In particular, an iteratively reweighted least squares (IRLS) method can be used. Such IRLS methods are conventional to the person skilled in the art.

To determine the linear velocity vector $_{B}v_{W,B}$ and the angular velocity vector $_{B}\omega_{W,B}$ of the rigid body, the velocity of the sensor is correlated with the (linear and angular)

velocity vectors of the body, the relative rotation $R_{B,Si}$ and translation ${}_{B}t_{B,Si}$ of the sensors fixedly attached to the body being used; equation (3):

$${}_{si}v_{W,si} = R_{si,B}({}_{B}v_{W,B} + {}_{B}\omega_{W,B} \times {}_{B}t_{B,si})$$

In this case, 'x' denotes the usual cross product of two three-dimensional vectors.

Using the notation:

$$\lfloor a \rfloor_x = \begin{pmatrix} 0 & -a_z & a_y \\ a_z & 0 & -a_x \\ -a_y & a_x & 0 \end{pmatrix}$$

this equation can be written as follows:

$${}_{Si}v_{W,Si} = \begin{bmatrix} R_{Si,B} & -R_{Si,B}\lfloor {}_{B}t_{B,Si} \rfloor_x \end{bmatrix} \begin{bmatrix} {}_{B}v_{W,B} \\ {}_{B}\omega_{W,B} \end{bmatrix}$$

The velocity of a sensor can thus be expressed by a vector that includes the linear and angular velocity vectors of the rigid body.

For a plurality of sensors 1, 2, . . . I, the corresponding equations can be written in combined form as equation system (4):

$$\begin{bmatrix} {}_{S1}v_{W,S1} \\ \vdots \\ {}_{SI}v_{W,SI} \end{bmatrix} = M \begin{bmatrix} {}_{B}v_{W,B} \\ {}_{B}\omega_{W,B} \end{bmatrix}$$

where the individual transformations (relative rotations and translations) of the various sensors are combined in the matrix M. Since the matrix M is known, this results in an equation system from which the velocity vectors ${}_{B}v_{W,B}$ and ${}_{B}\omega_{W,B}$ of the body can be determined, the equation system generally being overdetermined when there is an adequately high number of sensors.

One option for determining the movement state of the body, i.e., for determining the linear velocity vector ${}_{B}v_{W,B}$ and the angular velocity vector ${}_{B}\omega_{W,B}$, is first to determine the velocities ${}_{Si}v_{W,Si}$ of the sensors as explained above, i.e., to solve the above equation system (2) by way of a regression method for each of the sensors, and then to solve the above equation system (4), with a regression (e.g., the least squares method) being used again. Overall, this two-stage process represents a regression analysis. This two-stage approach can be referred to as a weak-coupling approach and has the advantage that it can be carried out relatively quickly, i.e., can be carried out using relatively little computing power by comparison with the other approaches.

Another approach, the so-called strong-coupling approach, involves determining the linear velocity vector ${}_{B}v_{W,B}$ and the angular velocity vector ${}_{B}\omega_{W,B}$ directly from the Doppler velocities, i.e., without determining the sensor velocities from the Doppler velocities beforehand, using a regression method that represents a regression analysis or at least part thereof. The strong-coupling approach generally leads to the movement state being determined more accurately.

For this purpose, the above equation (1) for the Doppler velocity and the above equation (3), which combines the sensor velocity with the velocity vectors of the rigid body, become:

$$-d_j = ({}_{Si}p_j^0)^T R_{Si,B}({}_{B}v_{W,B} + {}_{B}\omega_{W,B} \times {}_{B}t_{B,Si})$$

$$-d_j = \begin{bmatrix} ({}_{Si}p_j^0)^T R_{Si,B} & -({}_{Si}p_j^0)^T R_{Si,B}\lfloor {}_{B}t_{B,Si} \rfloor_x \end{bmatrix} \begin{bmatrix} {}_{B}v_{W,B} \\ {}_{B}\omega_{W,B} \end{bmatrix}$$

If there is a multiplicity of measurement data sets 1, . . . J, said equations can be combined into the following equation system (5):

$$\begin{pmatrix} -d_1 \\ \vdots \\ -d_J \end{pmatrix} = \begin{bmatrix} ({}_{Si}p_1^0)^T R_{Si,B} & -({}_{Si}p_1^0)^T R_{Si,B}\lfloor {}_{B}t_{B,Si} \rfloor_x \\ \vdots & \vdots \\ ({}_{Si}p_J^0)^T R_{Si,B} & -({}_{Si}p_J^0)^T R_{Si,B}\lfloor {}_{B}t_{B,Si} \rfloor_x \end{bmatrix} \cdot \begin{bmatrix} {}_{B}v_{W,B} \\ {}_{B}\omega_{W,B} \end{bmatrix}$$

$$\begin{pmatrix} -d_1 \\ \vdots \\ -d_J \end{pmatrix} = M \cdot \begin{bmatrix} {}_{B}v_{W,B} \\ {}_{B}\omega_{W,B} \end{bmatrix}$$

In this case, the multiplicity of measurement data sets from each of the plurality of sensors can each include a plurality of measurement data sets. By way of example, if, for example, four sensors are provided, each sensor could incorporate 50 to 150 measurement data sets into the equation system, i.e., a total of 200 to 600 measurement data sets. In this case, the index 'Si' is used in a generic sense, i.e., in each row of the equation system it is to be understood as the respective sensor or its sensor reference system to which the measurement data set is assigned. Therefore, measurement data sets from different sensors can be included in the equation system.

This equation system can be solved by way of a regression method. As above, therefore, a functional F is specified that is dependent on the differences or Doppler velocity deviations $(d_j - \hat{d}_j)$ between the measured Doppler velocities $d_j$ and the estimated Doppler velocities $\hat{d}_j$ and is minimized by the solution (in this case again by squared distances, by way of example):

$$F = F[(d_1 - \hat{d}_1)(d_j - \hat{d}_j), \ldots, (d_J - \hat{d}_J)] \sim \sum_j (d_j - \hat{d}_j)^2$$

In this case too, different measurement data sets can be weighted differently with weights or parameter weights $g_j$ on the basis of additional parameters of the measurement data sets:

$$F = F[g_1(d_1 - \hat{d}_1), \ldots, g_j(d_j - \hat{d}_j), \ldots, g_J(d_J - \hat{d}_J)] \sim \sum_j g_j^2 (d_j - \hat{d}_j)^2$$

In addition, individual measurement data sets can remain disregarded in equation system (5) on the basis of additional parameters.

In this context, and as above, the expression 'estimated Doppler velocities' refers to the fact that they can be calculated for a specific linear velocity vector ${}_{B}v_{W,B}$ (estimated as part of the regression method or the optimization) and a specific angular velocity vector ${}_{B}\omega_{W,B}$ using the rows on the left-hand side of the above equation system (5). In the regression method, a linear velocity vector ${}_{B}v_{W,B}$ and an angular velocity vector ${}_{B}\omega_{W,B}$ are then determined such that the respective functional is optimized or minimized. This represents a determination or estimation of the movement state of the body.

Figure 3:
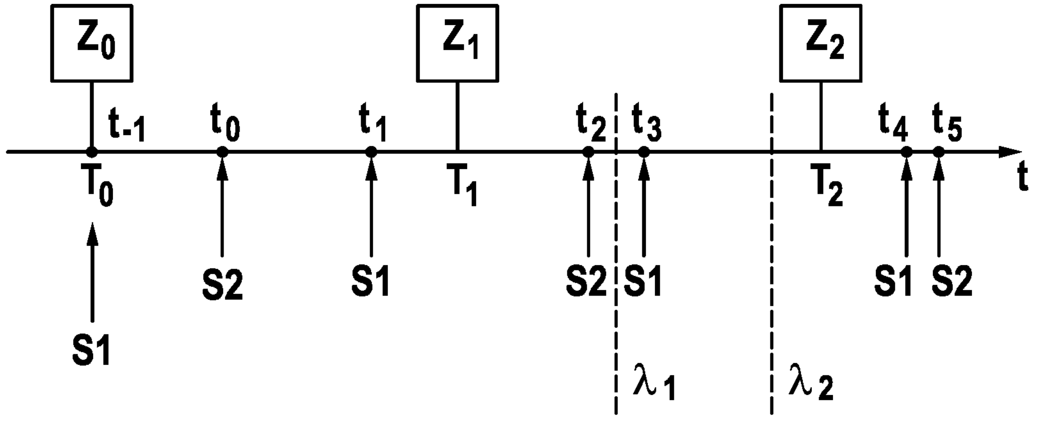
FIG. 3 shows a diagram having a plurality of determination and measurement times, according to an example embodiment of the present invention.

FIG. 3 shows a diagram of the sequence of a plurality of determination and measurement times over time. In the diagram, a plurality of determination times $T_0$, $T_1$, $T_3$ are plotted on a time axis t; these represent times for which the movement state of the rigid body is to be determined or estimated. In general, the determination time is not the same as a calculation time at which the movement state is determined or calculated.

The corresponding movement states are denoted by $Z_0=Z(T_0)$, $Z_1=Z(T_1)$, $Z_2=Z(T_2)$. A movement state $Z(T_k)$ at one time $T_k$ is characterized by the linear velocity vector ${}_Bv_{W,B}(T_k)$ and the angular velocity vector ${}_B\omega_{W,B}(T_k)$ of the rigid body at the relevant time $T_k$.

The determination times can, as shown, be arranged at a regular distance from one another, an interval $\Delta T$ between two successive determination times being specified as $\Delta T=T_{k+1}-T_k$. The inverse $1/\Delta T$ of the interval $\Delta T$ can be regarded as the determination frequency. More generally, however, determination times arranged at an irregular distance from one another are also possible.

In addition, a plurality of measurement times are indicated in the figure, i.e., times at which at least one sensor captures objects. At each measurement time, the sensor will determine a multiplicity of individual measurement data sets, each of which includes at least one Doppler velocity, an azimuth angle, and an elevation angle of a captured object. In addition, each of the measurement data sets can include additional parameters.

Besides the Doppler velocity, the azimuth angle, and the elevation angle, each of the measurement data sets includes a measurement time at which these were measured. Shown by way of example are measurement times $t_{-1}$, $t_0$, $t_1$, $t_2$, $t_3$, $t_4$, $t_5$ for two sensors S1 (measurement times $t_{-1}$, $t_1$, $t_3$, $t_4$) and S2 (measurement times $t_0$, $t_2$, $t_5$), where $t_{-1}$ in this case randomly coincides with $T_0$. The measurement times of the sensors can be independent of one another and/or independent of the determination times. In addition, where applicable measurement frequencies of different sensors can be different from one another and/or different from the determination frequency. In the figure, for example, the measurement frequency of the sensor S2 is the same as the determination frequency whereas the sensor S1 has a higher measurement frequency. Preferably, the measurement times of different sensors are different from one another so as to avoid interference.

A determination frequency or an average number of determination times per second can be in the range from 5-10 Hz, for example. The measurement frequency of a sensor or an average number of measurement times of the sensor per second can be in the range from 10-20 Hz, for example. The measurement frequencies (or average numbers of measurement times per second) of the sensors are preferably greater than the determination frequency (or an average number of determination times per second).

In principle, the movement state is determined or estimated by a regression method or a regression as described above, i.e., in accordance with the weak-coupling approach or the strong-coupling approach. In the process, measurement data sets having measurement times which occurred temporally close to the determination time, in particular within particular time limits around the determination time, are incorporated. By way of example, all the measurement data sets that occurred within a predetermined interval dT, i.e.: $|t_j-T_k|<dT$ can be incorporated; in this case, asymmetric limits having a lower interval $d_uT$ and an upper interval $d_oT$ are also possible: $-d_uT<t_j-T_k<d_oT$. Another option is to incorporate all the measurement data sets having measurement times $t_j$ that are between the previous determination time $T_{k-1}$ and the next determination time $T_{k+1}$: $T_{k-1}<t_j<T_{k+1}$ or expressed as the upper/lower interval, $d_oT=T_{k+1}-T_k$, and $d_uT=T_k-T_{k-1}$. In the case of determination times arranged at a regular distance from one another: $d_oT=d_uT=\Delta T$.

In general terms, therefore, measurement data sets having measurement times within a determination period are incorporated into the determination of the movement state for the determination time $T_k$. The determination period is determined by a lower and an upper time limit; for example, according to the above configuration, the interval $[T_k-d_uT; T_k+d_oT]$ can be a determination period. Preferably, the determination time $T_k$ is within the determination period. In addition, it is generally possible for the determination time $T_k$ to be outside the determination period, i.e., that $d_uT<0$ or $d_oT<0$ in the above example.

The movement state for a determination time is determined at least at one calculation time, which is generally different from the determination time for which the movement state is determined, so as to be able to also incorporate measurement data sets having measurement times after the determination time. By way of example, the figure indicates two calculation times $\lambda_1$, $\lambda_2$ at which the movement state $Z_1$ for the determination time $T_1$ can be determined, the first calculation time $\lambda_1$ being between two measurement times $t_2$, $t_3$ and the second calculation time $\lambda_2$ being after the measurement time $t_3$, in this case between the measurement time $t_3$ and the determination time $T_2$ for example. Equally, however, it could also coincide with said measurement time. For the above-described time limits around the determination time, the calculation time represents an upper limit; in other words, the quantity of measurement data sets to be taken into account is restricted such that only those that additionally satisfy the condition $t_j\leq\lambda_b$ are taken into account ($\lambda_b$ denotes a calculation time), i.e., those whose measurement time is at or before the calculation time. To determine the movement state $Z_1$ in FIG. 3, by way of example, the measurement data sets having measurement time $t_3$ are not taken into account at the determination time $\lambda_1$ whereas the measurement data sets having measurement time $t_3$ are taken into account at the determination time $\lambda_2$.

The movement state for a determination time can be determined multiple times, at a plurality of different calculation times. For instance, a determination could be triggered whenever new measurement data sets having measurement times within the time limits are available for the determination time. In this respect, it is also possible to do so only when the measurement time is after the determination time. In principle, however, it is also possible for a calculation time to be before the determination time for which the movement state is determined. By way of example, the measurement data sets having the measurement times $t_2$ and $t_3$ could be used at the determination time $\lambda_2$ in order to carry out a determination or estimation for the movement state $Z_3$ at the determination time $T_3$ (not shown in the figure). It is also possible to arrange the calculation times at a regular distance from one another in time. In addition, the calculation times could coincide with the determination times, the movement state for the previous determination time being determined in each case. In particular, the manner in which the calculation times are determined is also dependent on the available computing power.

To take account of the fact that the measurement times do not coincide with the determination times, the measurement data sets in the functional F that is to be minimized are weighted on the basis of the measurement time and the determination time. Therefore, weights $w_j$, which can be referred to as time weights, are provided and are dependent on the difference between the measurement time $t_j$ and the determination time $T_k$: $w_j=w_j(t_j-T_k)$; preferably the weights are dependent on the magnitude of the difference: $w_j=w_j(|t_j-T_k|)$. These weights should always be either positive or exactly zero.

The functional dependency of the weights should be selected such that when the difference between the measurement time $t_j$ and the determination time $T_k$ is exactly zero, the weight assumes its maximum value: $w_j(0)=w_{max}$, and decreases monotonically, preferably strictly monotonically, as the magnitude increases until the value zero is reached, the value zero preferably being reached when the upper limit $T_k+d_oT$ or lower limit $T_k-d_uT$ of the measurement times being taken into account is reached: $w_j(T_k+d_oT-T_k)=w_j(d_oT)=0=w_j(T_k-d_uT-T_k)=w_j(-d_uT)$. The maximum value can be selected as any positive number, for example exactly one: $w_{max}=1$. The maximum value $w_{max}$ is the same for all the measurement data sets (and, where applicable, for other additional measurements; see below).

In particular, the following may apply:

$$w_j = \begin{cases} w_{max} f\left(1 - \dfrac{t_j - T_k}{d_oT}\right) & ;\text{for} \quad t_i \in [T_k;\, T_k + d_oT] \\ w_{max} f\left(1 - \dfrac{T_k - t_j}{d_uT}\right) & ;\text{for} \quad t_j \in [T_k - d_uT;\, T_k] \\ 0 & ;\text{for} \quad t_j \notin [T_k - d_uT;\, T_k + d_oT] \end{cases}$$

More generally, the above linear decrease as the distance increases can also be modified by a function f that increases monotonically, preferably strictly monotonically, as the argument increases:

$$w_j = \begin{cases} w_{max} f\left(1 - \dfrac{t_j - T_k}{d_oT}\right) & ;\text{for} \quad t_i \in [T_k;\, T_k + d_oT] \\ w_{max} f\left(1 - \dfrac{T_k - t_j}{d_uT}\right) & ;\text{for} \quad t_j \in [T_k - d_uT;\, T_k] \\ 0 & ;\text{for} \quad t_j \notin [T_k - d_uT;\, T_k + d_oT] \end{cases}$$

For example, a quadratic function $f(x)=x^2$ could be used.

In the functional F that is to be minimized in the regression method, the measurement data sets are then weighted accordingly, i.e., the differences $(d_j-\hat{d}_j)$ between measured and estimated Doppler velocities are multiplied in the functional by the relevant time weight $w_j$ of the measurement data set; in other words, $w_j(d_j-\hat{d}_j)$ is used in the functional:

$$F = F\left[w_1(d_1 - \hat{d}_1), \ldots, w_j(d_j - \hat{d}_j), \ldots, w_J(d_J - \hat{d}_J)\right] \sim \sum_j w_j^2 (d_j - \hat{d}_j)^2$$

If additional weighting is carried out on the basis of additional parameters of the measurement data sets, the differences are additionally multiplied by the relevant parameter weight $g_j$; in other words, $g_jw_j(d_j-\hat{d}_j)$ is used in the functional:

$$F = F\left[g_1w_1(d_1 - \hat{d}_1), \ldots, g_jw_j(d_j - \hat{d}_j), \ldots, g_Jw_J(d_J - \hat{d}_J)\right] \sim \sum_j g_j^2 w_j^2 (d_j - \hat{d}_j)^2$$

In both cases here, the preferred quadratic functional in the arguments (i.e., in the weighted differences) was again stated as an example. This functional can be used for both the solution (in terms of the regression method) to equation system (5) and the solution to equation system (2).

Each row of equation system (5) or equation system (2) represents a condition for the linear velocity vector and the angular velocity vector or for the relevant velocity of the sensor. Since the rows of each equation system correspond to measurement data sets, each measurement data set can be deemed a condition.

To determine the movement state for a determination time, one set of conditions, i.e., one condition set, is selected from the set of all the measurement data sets at a calculation time and is used for determining the movement state. These are in particular the measurement data sets having a measurement time that is within an interval $[T_k-d_uT;\ T_k+d_oT]$ around the determination time $T_k$ (and whose measurement time is before or at the calculation time).

In this case, it is possible to add further conditions not originating from the measurement data sets to the set of conditions. These may be measurements by other measurement instruments and/or predetermined constraints on the movement of the body.

Preferably, an angular rate sensor or gyroscope is provided, which is arranged in particular at the origin of the body reference system. This then results in the following as an additional condition or equation for equation system (5):

$${}_B\tilde{\omega}_{W,B} = \begin{bmatrix} 0 & I \end{bmatrix} \begin{bmatrix} {}_Bv_{W,B} \\ {}_B\omega_{W,B} \end{bmatrix}$$

where ${}_B\tilde{\omega}_{W,B}$ is the angular velocity measured by the angular rate sensor and I is the three-dimensional unit matrix.

A constraint on the movement of the body (for instance a motor vehicle moving in a plane) could, for example, be as follows (in this case formulated as conditions for individual components of the velocity vector and angular velocity vector):

$${}_B\hat{v}z_{W,B} = 0,\ {}_B\hat{\omega}x_{W,B} = 0,\ {}_B\hat{\omega}y_{W,B} = 0$$

Each of these conditions is taken into account in the functional of the regression method using a respective (additional-condition) weight. The magnitude of the weight determines the extent to which the additional condition or constraint is taken into account. In addition, in the case of measurements, for instance the angular velocity measurement by the angular rate sensor, a (time) weight that is dependent on the measurement time in relation to the determination time can be provided. In particular, such time weights can be determined as described in the context of the measurement times of the sensors.

For example, in the case of angular velocity measurements by an angular rate sensor, an additional functional $F_G$ can be added to the above functional F to obtain a total functional: $F_{total}=F+F_G$, where $$F_G = F_G\left[Gw_G\left(\left|{}_B\tilde{\omega}_{W,B} - {}_B\hat{\tilde{\omega}}_{W,B}\right|\right)\right] \sim G^2 w_G^2 \left|{}_B\tilde{\omega}_{W,B} - {}_B\hat{\tilde{\omega}}_{W,B}\right|^2$$

$_B\hat{\omega}_{W,B}$ denotes the estimated angular velocity vector and |•| denotes the vector norm;

G is the weight on the basis of which the measurements taken by the angular rate sensor are taken into account;

$w_G$ is the time weight determined on the basis of the measurement time of the angular rate sensor.

Since the angular rate sensor typically has greater accuracy than sensors, and since generally a high number of measurement data sets and relatively few angular rate sensor measurements are available, the weight G is preferably selected to be much higher than the corresponding weighting of the sensor measurements. In the above formulas for the functional F, this corresponding weighting of the sensor measurements is in each case 1 or formulated otherwise; since a constant (positive) factor in the functional is not relevant for the optimization but merely represents a normalization, the functional for the measurement data sets can be normalized such that said corresponding weighting of the sensor measurements is exactly 1. The weight G is thus preferably selected to be much higher than 1: $G>>1$; e.g., $G>10$ or more, preferably $G>100$. Equally, the weight G can have an upper limit, for example $G<1000$.

As already mentioned above, a robust regression method is preferably used in order to minimize the effect of outliers, which are specified in particular by non-static objects. Preferably, an iteratively reweighted least squares (IRLS) method can be used.

In this case, the method starts from the above quadratic functional, and the quadratic deviation between estimated and measured Doppler velocities is weighted in the functional for each measurement data set or for each condition using an iteration weight $h_{j,k}$, where k denotes an iteration parameter and j denotes the measurement data set as before. By way of example, this then results in the following (the optional time weights $w_j$ and parameter weights $g_j$ being taken into account in this case):

$$F_{IRLS} = \sum_j h_{j,k} g_j^2 w_j^2 (d_j - \hat{d}_j)^2$$

For specific iteration weights $h_{j,k}$, said functional is minimized using the least squares method. On the basis of the discovered solution, i.e., on the basis of the discovered $\hat{d}_j$, new iteration weights $h_{j,k+1}$ are determined. In this case, iteration weights for which the discovered estimated Doppler velocities have a large deviation from the measured Doppler velocities are reduced in relation to those with a small deviation. A particular value can be specified as a starting value $h_{j,0}$ for the iteration weights, for instance 1: $h_{j,0}=1$, for all j.

Up to now, the azimuth angles θ and elevation angles ϕ included in the measurement data sets and included in the equation systems to be solved, in each case on the left-hand side, have been assumed to be exact. Generally, however, as measured values they represent values containing errors. To take this into account, an error-in-variables regression can preferably also be used.

In this case, the process can be as follows. First, the movement state is determined or estimated using the above-described strong-coupling approach. Next, using the determined movement state, an error-in-variables regression is carried out to optimize the azimuth angle θ and/or elevation angle ϕ. Using the determined optimized azimuth angle θ and/or elevation angle ϕ, the movement state is determined or estimated again using the strong-coupling approach, and the azimuth angle θ and/or the elevation angle ϕ are optimized again on that basis. This is repeated until the results converge, for example until successive determined movement states no longer change within a predetermined tolerance and/or until a predetermined maximum number of repetitions is reached. Overall, this approach again represents a regression analysis.

If the movement states of the rigid body are determined for a plurality of successive determination times, then by integrating the linear velocity vectors $_Bv_{W,B}$ and/or the angular velocity vectors $_B\omega_{W,B}$ over time it is possible to calculate a relative position and/or orientation of the body at an end determination time $T_{End}$ relative to a starting position and/or a starting orientation that was present at a starting determination time $T_{Start}$. Since the movement state is determined only for discrete determination times, the time integral is typically given as a sum.

Figure 4:
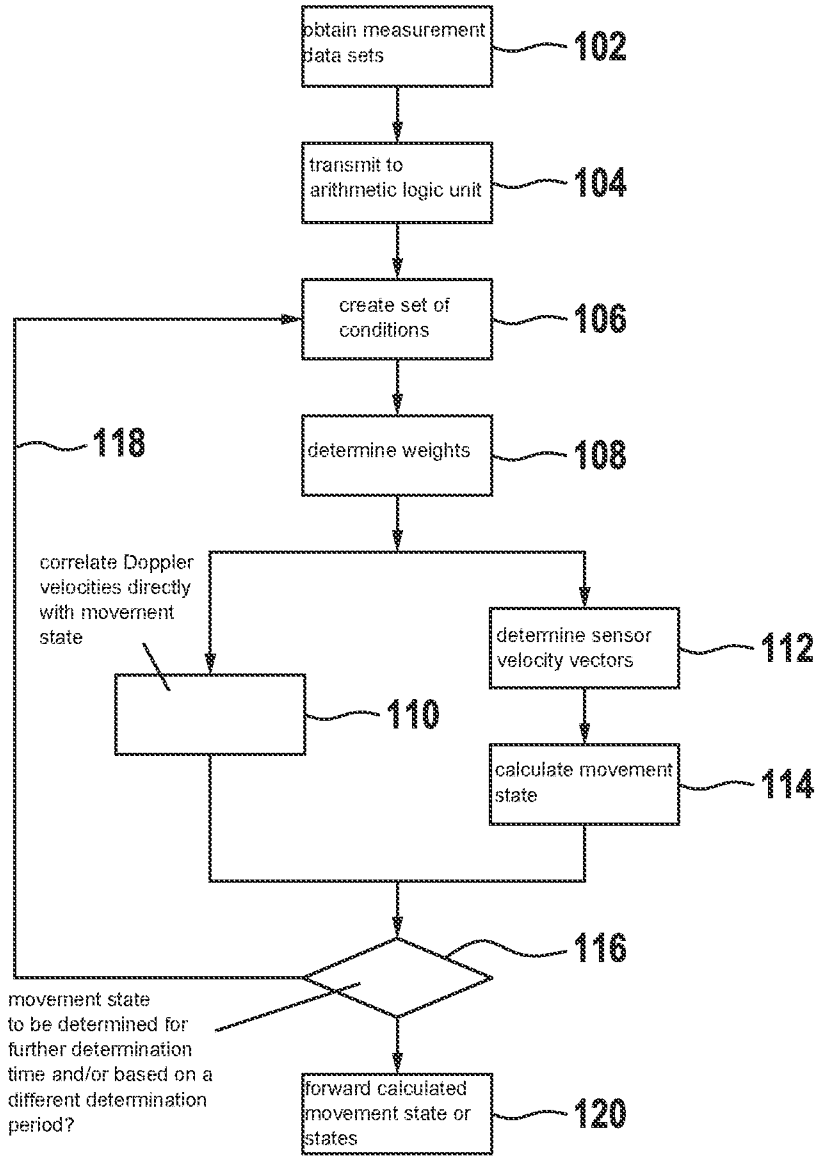
FIG. 4 shows a flowchart according to a preferred specific embodiment of the present invention.

FIG. 4 shows a flowchart of a preferred specific embodiment of the present invention.

In step 102, measurement data sets are obtained by one or more sensors. Likewise, further measurement results can be captured, in particular angular rate measurement results obtained by an angular rate sensor or a gyroscope. The capturing can be carried out at a plurality of measurement times; in particular, each sensor can take measurements and capture the measurement results continuously, for instance at a specific measurement frequency.

In step 104, the measurement data sets and, where applicable, further measurement results are transmitted to an arithmetic logic unit. In this case, the measurement data sets are sent by the sensors to the arithmetic logic unit and received thereby. Likewise, the further measurement results, where applicable, are sent by the relevant measurement sensors to the arithmetic logic unit and received thereby. In both cases, the sensors can be connected to the arithmetic logic unit either directly or indirectly; a buffer can also be provided in order to carry out an evaluation (i.e., to determine the movement state) at a later time. The arithmetic logic unit can be found either on or in the rigid body whose movement state is to be determined. Equally, the arithmetic logic unit can be remote from the body, e.g., can be a remote computer or server. The measurement results can be transmitted to the arithmetic logic unit via a communication network (for example also wirelessly) or on suitable data media (e.g., when evaluating the results at a later time).

Steps 102 and 104 together can be regarded as the providing step. Providing can also be carried out in a different way, for example if the measurement data sets and the further measurement results are already available as stored data or if simulated measurement data sets are used. In this respect, steps 102 and 104 are preferred steps.

In step 106, at least one set of conditions is created from the measurement data sets and, where applicable, further measurement results. The process here is as described above in relation to FIG. 3. Therefore, for a determination time for which the movement state is to be determined or calculated, measurement data sets and, where applicable, further measurement results having measurement times within a determination period are incorporated into a set of conditions. This can be done once or multiple times at corresponding calculation times.

In preferred step 108, weights are determined, by which the measurement data sets and, where applicable, further measurement results incorporated in the set of conditions are weighted in the functional used in the regression analysis. As described above, these are time weights and/or parameter weights and/or, where applicable, weights by which the further measurement results are weighted relative to the measurement data sets. These weights are determined before the actual regression method is carried out and remain unchanged while the regression method is carried out (for one calculation time). In addition, further weights that are different from those above and, where applicable, are changed over a plurality of iterations of the regression method can be used during the regression analysis, for example the above-mentioned iteration weights in the case of IRLS. Filtering can also be carried out here, in which certain measurement data sets are excluded from a set of conditions on the basis of additional parameters of the measurement data sets.

Next, on the basis of the at least one set of conditions, a regression analysis is carried out, in which the movement state (linear velocity vector and angular velocity vector) of the body is determined.

On the one hand, step 110 can be carried out in accordance with the strong-coupling approach; in other words, the Doppler velocities are correlated directly with the movement state in the regression analysis (equation system (5)).

On the other hand, the weak-coupling approach can be used. In this case, in step 112 the sensor velocity vectors are first determined by correlating them with the Doppler velocities in a regression method. Next, in step 114, the movement state is calculated from the sensor velocity vectors in a further regression.

As explained above in relation to step 108, in steps 110, 112, and 114 further, variable weights that are different from the time weights, parameter weights, and weights by which further measurement results are weighted can be used, where applicable, as part of the regression method being used in each case (for instance as part of IRLS).

In a preferred step 116, it can be determined whether the movement state of the vehicle is to be determined for a further determination time and/or on the basis of a different determination period, for instance if new measurement data sets are now available. If this is the case, the method can jump back to step 106 (arrow 118), in which at least one new set of conditions is determined for the further determination time and/or on the basis of a different determination period. Irrespective of this, the method can continue with the optional step 120 for ready-calculated movement states.

In preferred step 120, the calculated movement state or states can be output and/or forwarded for further processing. In particular, if movement states have been determined for a plurality of successive determination times, the movement states can be integrated over time in order to determine a relative position and orientation of the body between a starting state at an earlier determination time and an end state at a later determination time.

What is claimed is:

1. A method for determining a movement state of a rigid body relative to an environment using a multiplicity of measurement data sets relating to objects in the environment around the body, wherein each of the measurement data sets includes a measurement time, a Doppler velocity, and an azimuth angle in relation to a sensor reference system of a sensor, the method comprising the following steps:

determining the movement state of the body relative to the environment as a velocity vector and an angular velocity vector in a body reference system, wherein each sensor reference system can be translated into the body reference system by a non-singular transformation, the determining of the movement state including:

creating at least one set of conditions that includes a plurality of the measurement data sets, and minimizing in a regression analysis for the at least one set of conditions a functional that is dependent on Doppler velocity deviations between estimated Doppler velocities and the Doppler velocities of the measurement data sets included in the at least one set of conditions, wherein the estimated Doppler velocities are represented as dependent variables in the regression analysis, wherein one or more components of the velocity vector and/or of the angular velocity vector are determined by the regression analysis.

2. The method as recited in claim 1, wherein at least one of the measurement data sets includes an elevation angle, and wherein at least some of the one or more measurement data sets are determined from measurement results that include only a measurement time, the Doppler velocity, and the azimuth angle, wherein the elevation angle is set to be the same as a predetermined value which is exactly zero.

3. The method as recited in claim 1, wherein the measurement data sets are captured using one or more sensors that are attached to the body and capture the environment around the body.

4. The method as recited in claim 1, wherein the measurement data sets include at least two measurement data sets from a sensor having different measurement times.

5. The method as recited in claim 1, wherein the measurement times of the measurement data sets from at least two different sensors are different from one another.

6. The method as recited in claim 1, wherein the movement state for one determination time is determined at least at one calculation time, and wherein the at least one set of conditions is created from the measurement data sets whose measurement times are within a determination period.

7. The method as recited in claim 6, wherein, in the functional, the Doppler velocity deviations are multiplied by a positive time weight that is a function of a time difference between the measurement time of a measurement data set and the determination time for which the movement state is determined, wherein the time weight decreases as a magnitude of the time difference increases.

8. The method as recited in claim 6, wherein the movement state for a plurality of successive determination times is determined, wherein each determination period of the plurality of successive determination times has a lower time limit and an upper time limit, wherein the lower time limit is identical to a previous determination time of the plurality of successive determination times and the upper time limit is identical to a subsequent determination time of the plurality of successive determination times or to the calculation time.

9. The method as recited in claim 6, wherein a first determination of the movement state for the determination time is carried out based on a first determination period, and a second determination of the movement state for the determination time is carried out based on a second determination period, wherein the second determination period is different from the first determination period and includes at least one measurement time that is not included in the first determination period, and wherein the first determination is carried out at a first calculation time and the second determination is carried out at a second, later calculation time, wherein an upper time limit of the second determination period comes after the first calculation time.

10. The method as recited in claim 1, wherein the estimated Doppler velocities are also represented in the regression analysis as being dependent on the velocity vector and the angular velocity vector by using the transformation between the respective sensor reference system and the body reference system, and the velocity vector and the angular velocity vector are determined such that the functional is minimized.

11. The method as recited in claim 1, wherein:

a plurality of sets of conditions are created which each include measurement data sets from just one sensor;

a plurality of sensor velocity vectors are determined in each sensor reference system by also representing the estimated Doppler velocities as being dependent on the sensor velocity vector for each of the sets of conditions in the regression analysis, and the velocity vector of the body is determined such that the respective functional is minimized; and in a regression, the velocity vector and the angular velocity vector are determined such that a regression functional, which is dependent on sensor deviations between the sensor velocity vectors and estimated sensor velocity vectors, is minimized, wherein the sensor velocity vectors are also represented as being dependent on the velocity vector and the angular velocity vector by using the transformation between the body reference system and the respective sensor reference system.

12. The method as recited in claim 11, wherein the movement state for one determination time is determined at least at one calculation time, and wherein the at least one set of conditions is created from the measurement data sets whose measurement times are within a determination period, wherein each of the sets of conditions only includes measurement data sets that have the same measurement time, and wherein in the regression functional, the sensor deviations are each multiplied by a weight that is a function of the time difference between the measurement time of the set of conditions and the determination time for which the movement state is determined.

13. The method as recited in claim 11, wherein the sets of conditions include at least one component constraint on at least one component of the velocity vector and/or of the angular velocity vector in the form of at least one component default value; wherein the functional or the regression functional is also dependent on a component deviation between the at least one component default value and at least one estimated component default value.

14. The method as recited in claim 13, wherein the movement state for one determination time is determined at least at one calculation time, and wherein the at least one set of conditions is created from the measurement data sets whose measurement times are within a determination period, wherein at least one angular velocity component, which is determined by an angular rate sensor, is used in the body reference system as a component default value, and wherein, in the functional or the regression functional, the at least one component deviation is multiplied by a weight that is a function of a time difference between a measurement time of the angular velocity component and the determination time for which the movement state is determined.

15. The method as recited in claim 1, wherein:

the measurement data sets each include at least one additional parameter selected from: a distance from a captured object, and/or a variance in the distance, and/or a variance in the azimuth angle, and/or a variance in the elevation angle, and/or a variance in the Doppler velocity, and/or a signal strength of a received signal, and/or a cross section, and/or a radar cross section or LiDAR cross section, in each case based on the captured object of the measurement data set, and/or a type of sensor, and/or an arrangement of the sensor on the body, and wherein the Doppler velocity deviations are multiplied by an additional weight that is a function of the additional parameter, and/or a measurement data set is rejected when the at least one additional parameter is outside at least one predetermined range.

16. The method as recited in claim 1, wherein: i) the regression analysis is carried out using an error-in-variables regression method, and/or ii) the azimuth angle is optimized, and/or iii) the regression analysis is carried out using an iteratively reweighted least squares method.

17. A method for determining a relative position and/or a relative orientation of a rigid body, comprising the following steps:

determining a plurality of movement states of the body for a plurality of successive determination times, each of the movement states being determined relative to an environment using a multiplicity of measurement data sets relating to objects in the environment around the body, wherein each of the measurement data sets includes a measurement time, a Doppler velocity, and an azimuth angle in relation to a sensor reference system of a sensor, each movement state being determined by:

determining the movement state of the body relative to the environment as a velocity vector and an angular velocity vector in a body reference system, wherein each sensor reference system can be translated into the body reference system by a non-singular transformation, the determining of the movement state including:

creating at least one set of conditions that includes a plurality of the measurement data sets, and minimizing in a regression analysis for the at least one set of conditions a functional that is dependent on Doppler velocity deviations between estimated Doppler velocities and the Doppler velocities of the measurement data sets included in the at least one set of conditions, wherein the estimated Doppler velocities are represented as dependent variables in the regression analysis, wherein one or more components of the velocity vector and/or of the angular velocity vector are determined by the regression analysis;

integrating the movement states over time between a starting determination time of the plurality of determination times and an end determination time of the plurality of determination times to obtain the relative position and/or the relative orientation as results of the integration.

18. An arithmetic logic unit configured to obtain a multiplicity of measurement data sets and configured to determine a movement state of a rigid body relative to an environment using the multiplicity of measurement data sets that relate to objects in the environment around the body, wherein each of the measurement data sets includes a measurement time, a Doppler velocity, and an azimuth angle in relation to a sensor reference system of a sensor, the arithmetic logic unit configured to:

determine the movement state of the body relative to the environment as a velocity vector and an angular velocity vector in a body reference system, wherein each sensor reference system can be translated into the body reference system by a non-singular transformation, the determining of the movement state including:

creating at least one set of conditions that includes a plurality of the measurement data sets, and minimizing in a regression analysis for the at least one set of conditions a functional that is dependent on Doppler velocity deviations between estimated Doppler velocities and the Doppler velocities of the measurement data sets included in the at least one set of conditions, wherein the estimated Doppler velocities are represented as dependent variables in the regression analysis, wherein one or more components of the velocity vector and/or of the angular velocity vector are determined by the regression analysis.

19. A device, comprising:

one or more sensors that are attached to a body of the device, and that capture an environment around the body, the one or more sensors being configured to take measurements of objects in the environment and to send measurement data sets captured to an arithmetic logic unit; and the arithmetic logic unit configured to obtain a multiplicity of the measurement data sets and configured to determine a movement state of a rigid body relative to an environment using the multiplicity of measurement data sets what relate to objects in the environment around the body, wherein each of the measurement data sets includes a measurement time, a Doppler velocity, and an azimuth angle in relation to a sensor reference system of a sensor of the one or more sensors, the arithmetic logic unit configured to:

determine the movement state of the body relative to the environment as a velocity vector and an angular velocity vector in a body reference system, wherein each sensor reference system can be translated into the body reference system by a non-singular transformation, the determining of the movement state including:

creating at least one set of conditions that includes a plurality of the measurement data sets, and minimizing in a regression analysis for the at least one set of conditions a functional that is dependent on Doppler velocity deviations between estimated Doppler velocities and the Doppler velocities of the measurement data sets included in the at least one set of conditions, wherein the estimated Doppler velocities are represented as dependent variables in the regression analysis, wherein one or more components of the velocity vector and/or of the angular velocity vector are determined by the regression analysis.

20. The device as recited in claim 19, wherein the one or more sensors are radar sensors and/or LiDAR sensors.

21. A non-transitory machine-readable storage medium on which is stored a computer program for determining a movement state of a rigid body relative to an environment using a multiplicity of measurement data sets relating to objects in the environment around the body, wherein each of the measurement data sets includes a measurement time, a Doppler velocity, and an azimuth angle in relation to a sensor reference system of a sensor, the computer program, when executed by an arithmetic logic unit, causing the arithmetic logic unit to perform the following steps:

determining the movement state of the body relative to the environment as a velocity vector and an angular velocity vector in a body reference system, wherein each sensor reference system can be translated into the body reference system by a non-singular transformation, the determining of the movement state including:

creating at least one set of conditions that includes a plurality of the measurement data sets, and minimizing in a regression analysis for the at least one set of conditions a functional that is dependent on Doppler velocity deviations between estimated Doppler velocities and the Doppler velocities of the measurement data sets included in the at least one set of conditions, wherein the estimated Doppler velocities are represented as dependent variables in the regression analysis, wherein one or more components of the velocity vector and/or of the angular velocity vector are determined by the regression analysis.

* * * * *